United States Patent [19]
Lee

[11] Patent Number: 6,050,627
[45] Date of Patent: Apr. 18, 2000

[54] DEVICE FOR EXTENDING THE BED OF A TRANSPORT VEHICLE

[76] Inventor: William R. Lee, P.O. Box 2145, Hattiesburg, Miss. 39403

[21] Appl. No.: 09/030,523

[22] Filed: Feb. 24, 1998

[51] Int. Cl.[7] ....................................................... B60P 3/40
[52] U.S. Cl. ........................ 296/26.09; 108/44; 224/405; 224/547; 280/404
[58] Field of Search ................... 296/3, 26.08, 26.09; 108/44; 224/402, 403, 404, 405, 547; 280/35, 78, 403, 404, 415, 460 R, 638, 639, 656; 414/522

[56] References Cited

U.S. PATENT DOCUMENTS

| | | | |
|---|---|---|---|
| 1,366,771 | 1/1921 | Devencenzi | 296/26.09 |
| 2,468,579 | 4/1949 | Vuori | 296/26.09 |
| 2,788,137 | 4/1957 | Harkness | 414/522 |
| 4,023,850 | 5/1977 | Tillery | 296/26 |
| 4,314,712 | 2/1982 | Owen et al. | 280/404 |
| 4,372,569 | 2/1983 | Otterson | 280/78 |
| 4,484,759 | 11/1984 | Zwick | 280/460 R |
| 4,856,840 | 8/1989 | Hanley | 296/26 |
| 5,368,325 | 11/1994 | Hazen | 280/656 |
| 5,451,088 | 9/1995 | Broad | 296/26 |
| 5,458,389 | 10/1995 | Young | 296/26 |
| 5,501,500 | 3/1996 | Cannon | 296/26 |
| 5,560,666 | 10/1996 | Vieira et al. | 296/3 |
| 5,649,731 | 7/1997 | Tognetti | 296/26 |
| 5,678,743 | 10/1997 | Johnson et al. | 224/485 |
| 5,850,959 | 12/1998 | Miller | 224/535 |

*Primary Examiner*—D. Glenn Dayoan
*Assistant Examiner*—Paul Chenevert
*Attorney, Agent, or Firm*—Richard L. Miller

[57] ABSTRACT

A bed extender for extending the usable bed length of a vehicle. The extender includes hitch connecting apparatus, supporting apparatus, and positioning apparatus. The hitch connecting apparatus removably connects the bed extender with the orifice of a receiver hitch so as to allow the bed extender to be completely removed from the vehicle when the bed extender is not in use. The supporting apparatus supports a load when the load is substantially beyond the length of the bed of the vehicle so as to allow the weight of that portion of the load beyond the vehicle bed to be translated to the receiver hitch via the supporting apparatus and the hitch connecting apparatus. The positioning apparatus attaches the hitch connecting apparatus to the supporting apparatus and is substantially vertical. The positioning apparatus has an upper end connected to the supporting apparatus and a lower end connected to the hitch connecting apparatus and is of appropriate length so as to allow the supporting apparatus to be at least substantially the same height as the vehicle bed of the vehicle and is adjustable so as to allow the height of the supporting apparatus to be adjusted relative to the receiver hitch of the vehicle so as to accommodate various vehicle models and tailgate configurations.

5 Claims, 1 Drawing Sheet

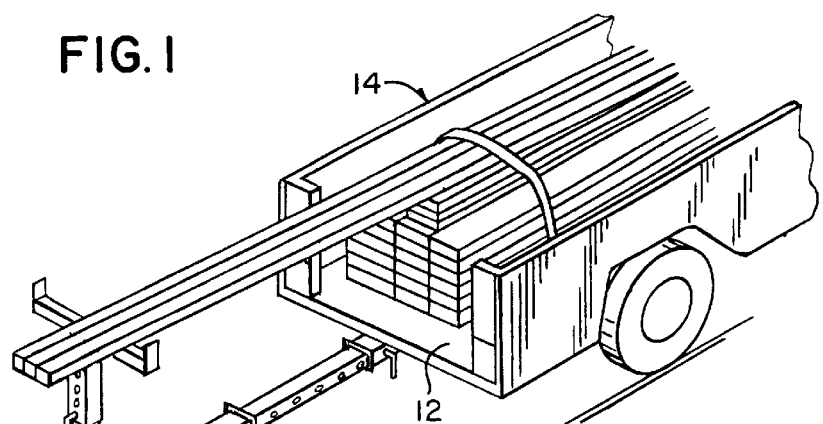
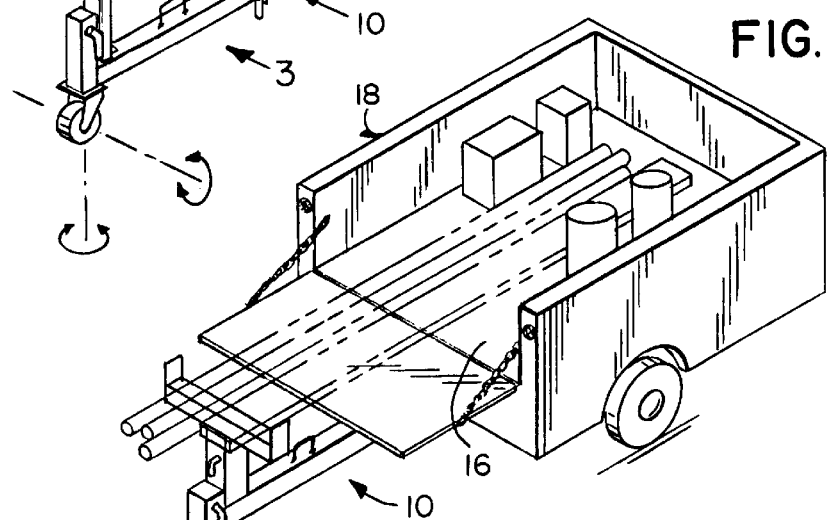
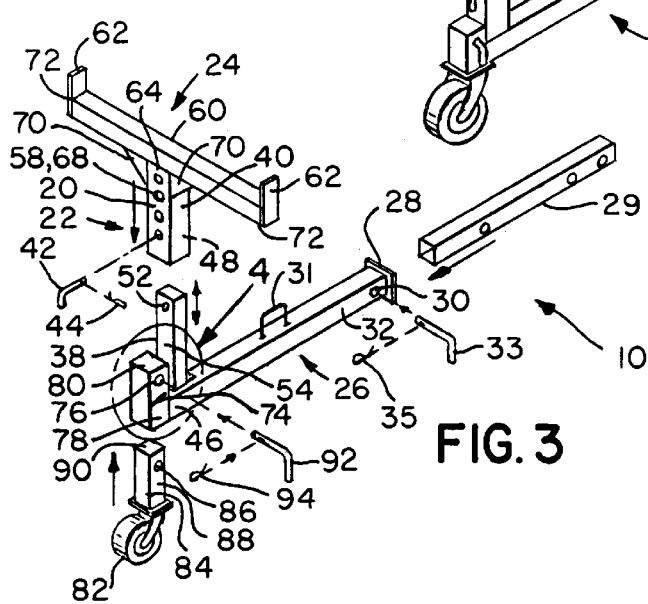
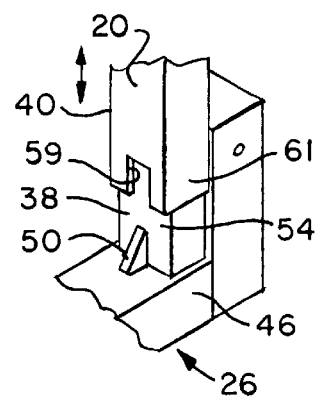

DEVICE FOR EXTENDING THE BED OF A TRANSPORT VEHICLE

BACKGROUND OF THE INVENTION

1. Field of the Invention

The present invention relates, generally, to devices for extending the bed length of a vehicle that has a bed upon which items may be transported, and more particularly, to such devices which are mounted to the vehicle using the receiver of a standard vehicle.

2. Description of the Prior Art

It is often necessary to transport an item or items having a length that is greater than the bed length of the vehicle. When the items are transported, the items will extend beyond the bed of the vehicle and may be damaged during transport because of a lack of vertical support. What is needed is a device, attachable to the vehicle, that will provide vertical support to the item during transport.

Ideally the device would be quickly and easily attached and removed from the vehicle, easily stored with the vehicle when not in use, and adapted for use with a standard receiver hitch which is already permanently attached to the vehicle.

Various attempts have been made to provide such a device. None of these devices has provided a bed extender which meets all the above mentioned criteria. Some of the devices are permanently attached to the vehicle and cannot be removed when not in use. Others require support from a bulky and cumbersome suspension bridge type assembly.

Numerous innovations for trailer related devices have been provided in the prior art that will be described. Even though these innovations may be suitable for the specific individual purposes to which they address, however, they differ from the present invention.

FOR EXAMPLE, U.S. Pat. No. 4,023,850 to Tillery teaches a horizontal extension panel provided for disposition immediately outwardly of the free end of the open tailgate of a pickup truck with the extension panel structure substantially coextensive with the tailgate and the opposing marginal edges of the extension panel structure and tailgate disposed in abutted relation. A pair of support arms extend across the upper surface of the extension panel structure along the opposite side marginal edges thereof and the support arms extend over the opposite side marginal edges of the tailgate and include terminal ends which overlap the opposite side marginal portions of the rear end of the floor of the pickup truck. A pair of rearwardly and downwardly inclined brace arms or members are secured at their rear lower ends to the outer portions of the support arms secured to the extension panel structure and the upper forward ends of the brace arms are secured to the upper rear marginal edge portions of the side walls of the pickup truck. In addition, upstanding braces are secured at their upper ends to the upper ends of the brace arms and at their lower ends to those portions of the support arms disposed immediately therebelow and overlying the opposite side marginal portions of the tailgate. Finally, the forward end portions of the support arms include downwardly directed flanges which are telescoped downwardly into the slot defined between the rear end edge of the flooring of the pickup truck load bed and the adjacent marginal edge of the tailgate.

ANOTHER EXAMPLE, U.S. Pat. No. 4,314,712 to Owen et al. teaches an improved trailer provided for use with an automotive draft vehicle. The trailer is of the class including a coupling member attached on its forward end to a draft vehicle and having a trailer rear axle assembly slidably mounted on the rear end so as to be movable longitudinally along the coupling pole between predetermined long-coupled and short-coupled positions to thereby adjust the effective length of the trailer. Improved coupling assemblies are also provided for adjusting the effective length of the trailer and maintaining the rear axle assembly in the adjusted positions.

STILL ANOTHER EXAMPLE, U.S. Pat. No. 4,372,569 to Otterson teaches a single wheel support for a vehicle-towed trailer. The support includes a swivel plate mounted on the trailer for swiveling about an upright axis. An elongate arm assembly is mounted adjacent one of its ends on the swivel plate for swinging about a horizontal swing axis. The wheel in the support is rotatably mounted on the other end of the assembly rearwardly of the swing axis. The arm assembly is biased in a direction opposing the weight of the trailer by a coiled spring compressibly interposed between the plate and a back region of the arm assembly, and by a coiled spring under tension interposed between the plate and a front region of the assembly.

YET ANOTHER EXAMPLE, U.S. Pat. No. 4,484,759 to Zwick teaches a hitch assembly for a single wheel trailer that includes an elongated hitch bar which is adapted to be mounted on a trailer hitch of a vehicle for towing the trailer. The hitch bar extends parallel to the rear bumper of the vehicle, and a pair of angles are adjustably mounted on the bar for vertical movement for engaging the bottom of the bumper. A pair of bumper pads are adjustably mounted on the bar for fore-and-aft movement for engaging the rear end of the bumper. A pair of latch assemblies on the bar releasably connect a pair of attaching tongues on the trailer to the bar. Each latch assembly includes a hook for engaging a pin on one of the tongues, and the vertical position of the pin is adjustable.

STILL YET ANOTHER EXAMPLE, U.S. Pat. No. 4,856,840 to Hanley teaches a truck bed extender comprising a platform which is removably attachable to the rear end of a truck; the platform including a plurality of rods with lips, provided on one side of the platform, the lips engaging the rear end of the truck bed when the rods are inserted between the rear end of the truck bed and the front end of a horizontal positioned open tailgate.

YET STILL ANOTHER EXAMPLE, U.S. Pat. No. 5,368,325 to Hazen teaches a trailer for towing by an automotive type vehicle that includes a single longitudinal beam. A plurality of adjustable transverse cradle support members are mounted along the beam. A single castered wheel is mounted near the back end of the beam. A hitch for attachment to a towing vehicle at the front end of the beam maintains the beam aligned with a longitudinal axis of the towing vehicle. Various types of loads may be accommodated by attaching appropriate type cradles to the cradle support members, and the spacing of support members may be adjusted to accept the load.

STILL YET ANOTHER EXAMPLE, U.S. Pat. No. 5,458,389 to Young teaches a adjustable bed extender which is attachable to the receiver orifice of a standard receiver hitch. The device provides support for loads which extend beyond the bed of a truck or any vehicle having a bed. The device includes a drawbar which fits into the receiver orifice of the hitch already permanently to the vehicle, a support assembly which supports the load, and an adjustable connection between the support assembly and drawbar for adjusting the height of the support assembly for different vehicle models and tailgate configuration.

FINALLY, YET STILL ANOTHER EXAMPLE, U.S. Pat. No. 5,501,500 to Cannon teaches an elongated plate, shaped to fit within a pick up truck bed, extends past the end of a opened tailgate on the truck. The plate serves to extend the usable length of the truck bed. The plate is supported at a front end by two stabilizer bars telescoping adjustable tubular supports, which extend from the forward sides of the plate up to the inner lip of the truck bed. The rear of the plate is supported by an undercarriage which is attached to the bumper by a speed connection, which locks the undercarriage to the truck bumper.

It is apparent that numerous innovations for trailer related devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a device for extending the bed of a transport vehicle that avoids the disadvantages of the prior art.

ANOTHER OBJECT of the present invention is to provide a device for extending the bed of a transport vehicle that is simple and inexpensive to manufacture.

STILL ANOTHER OBJECT of the present invention is to provide a device for extending the bed of a transport vehicle that is simple to use.

BRIEFLY STATED, YET ANOTHER OBJECT of the present invention is to provide a bed extender for extending the usable bed length of a vehicle. The extender includes hitch connecting apparatus, supporting apparatus, and positioning apparatus. The hitch connecting apparatus removably connects the bed extender with the orifice of a receiver hitch so as to allow the bed extender to be completely removed from the vehicle when the bed extender is not in use. The supporting apparatus supports a load when the load is substantially beyond the length of the bed of the vehicle so as to allow the weight of that portion of the load beyond the vehicle bed to be translated to the receiver hitch via the supporting apparatus and the hitch connecting apparatus. The positioning apparatus attaches the hitch connecting apparatus to the supporting apparatus and is substantially vertical. The positioning apparatus has an upper end connected to the supporting apparatus and a lower end connected to the hitch connecting apparatus and is of appropriate length so as to allow the supporting apparatus to be at least substantially the same height as the vehicle bed of the vehicle and is adjustable so as to allow the height of the supporting apparatus to be adjusted relative to the receiver hitch of the vehicle so as to accommodate various vehicle models and tailgate configurations.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a diagrammatic perspective view of the present invention extending the bed length of a truck;

FIG. 2 is a diagrammatic perspective view of the present invention extending the bed length of a trailer;

FIG. 3 is an exploded diagrammatic perspective view of the present invention generally located by the arrow 3 in FIG. 1; and invention; and FIG. 4 is an enlarged fragmented diagrammatic perspective view of the area generally enclosed by the dotted ellipse identified by arrow 4 in FIG. 3.

LIST OF REFERENCE NUMERALS UTILIZED IN THE DRAWING 10 device for extending the bed of a transport vehicle of the present invention
12 bed of truck 14
14 truck
16 bed of trailer 18
18 trailer
20 opposed front and rear walls of vertical support 40 of positioning apparatus 22
22 positioning apparatus
24 support assembly
26 drawbar
28 insertion end of drawbar 26
29 adapter
30 pair of coaxially aligned apertures formed laterally through two opposed sidewalls 32 of insertion end 28 of drawbar 26
31 handle on the drawbar 26
32 two opposed sidewalls of insertion end 28 of drawbar 26
33 positioning pin
35 positioning pin clip
38 drawbar vertical member of positioning apparatus 22
40 vertical support bar of positioning apparatus 22
42 positioning pin of positioning apparatus 22
44 positioning pin clip
46 tail end of drawbar 26 and 48 internal passageway in vertical support bar 40 of positioning apparatus 22
50 gusset plate
52 pair of coaxially aligned stationary holes in opposed front and rear walls 54 of drawbar vertical member 38 of the positioning apparatus 22
54 opposed front and rear walls of drawbar vertical member 38 of the positioning apparatus 22
58 securing holes in vertical support bar 40 of positioning apparatus 22
59 notch in lower end 61 of vertical support bar 40 of positioning apparatus 22
60 horizontal support bar of support assembly 24
61 lower end of vertical support bar 40 of positioning apparatus 22
62 load holders of support assembly 24
64 upper end of vertical support bar 40 of positioning apparatus 22
68 plurality of pairs of coaxially aligned securing holes of securing holes 58 through opposed front and rear walls of vertical support bar 40 of positioning apparatus 22
70 pair of rigid triangular shaped braces of the support assembly 24
72 ends of horizontal support bar 60 of support assembly 24
74 wheel vertical member rigidly attached to tail end 46 of drawbar 26
76 pair of opposing apertures through opposing side walls 78 of wheel vertical member 74 rigidly attached to tail end 46 of drawbar 26
78 side walls of wheel vertical member 74
80 tops of opposing side walls 78 of wheel vertical member 74 rigidly attached to tail end 46 of drawbar 26
82 single caster wheel
84 vertical wheel support bar 86 pair of opposing apertures through opposing side walls 88 of vertical support bar 84
88 opposing side walls of vertical support bar 84
90 tops of opposing side walls 88 of vertical support bar 84
92 positioning pin
94 positioning pin clip

DETAILED DESCRIPTION OF THE PREFERRED EMBODIMENT

Referring now to the figures in which like numerals indicate like parts, and particularly to FIGS. 1 and 2, the device for extending the bed of a transport vehicle of the present invention is shown generally at 10 extending the bed 12 of a truck 14 and extending the bed 16 of a trailer 18, respectively.

The configuration of the device for extending the bed of a transport vehicle 10 can best be seen in FIGS. 3 and 4, and as such will be discussed with reference thereto.

The device for extending the bed of a transport vehicle 10 comprises a drawbar 26, positioning apparatus 22, and a support assembly 24.

The drawbar 26 may be of any desired length for application to various vehicle models and tailgate configurations. The length of the drawbar 26 is of course subject to the strength of the materials from which the drawbar 26 is constructed. Although square steel tubing is the preferred material of construction, any material that can support a load at the lever arm of the desired length so as not to exceed the tongue capacity of the hitch is suitable. A smaller cross-section drawbar could be used for standard receiver hitches which are of a smaller cross-section and are for lighter applications.

An insertion end 28 of the drawbar 26 is adapted to be attached, via an adapter 29, to a receiver orifice of a standard receiver hitch, with the drawbar 26 having a handle 31 thereon for assisting in the insertion process.

The insertion end 28 of the drawbar 26 also includes a pair of coaxially aligned apertures 30 formed laterally through two opposed sidewalls 32, with a positioning pin 33 for passing therethrough and through the adapter 29 and being maintained therein by a positioning pin clip 35.

The positioning apparatus 22 includes a drawbar vertical member 38, a vertical support bar 40, a positioning pin 42, and a positioning pin clip 44. The drawbar vertical member 38 of the positioning apparatus 22 is preferably constructed from round or polygonal rigid tubing that is telescopically received by vertical support bar 40 of the positioning apparatus 22 so as to prevent rain from entering the vertical support bar 40 of the positioning apparatus 22.

The drawbar vertical member 38 of the positioning apparatus 22 is rigidly attached to a tail end 46 of the drawbar 26, with the longitudinal axis of an internal passageway 48 in the vertical support bar 40 of the positioning apparatus 22 being substantially perpendicular to the axis of the pair of coaxially aligned apertures 30 in the two opposed sidewalls 32 of the insertion end 28 of drawbar 26.

The drawbar vertical member 38 of the positioning apparatus 22 is attached to the drawbar 26 by welding with a gusset plate 50 for added strength, but other means of rigid attachment, such as brackets or bolts, are suitable.

The drawbar vertical member 38 of the positioning apparatus 22 also includes a pair of coaxially aligned stationary holes 52 in opposed front and rear walls 54 thereof for receiving the positioning pin 42 of the positioning apparatus 22, and mating with securing holes 58 in the vertical support bar 40 of the positioning apparatus 22.

It is to be understood, however, that a single hole through one of the opposed front and rear walls 54 of the drawbar vertical member 38 of the positioning apparatus 22 for receiving the positioning pin 42 of the positioning apparatus 22, and mating with securing holes 58 in the vertical support bar 40 of the positioning apparatus 22 would also be suitable without departing in any way from the spirit of the present invention.

The dimensions and the shape of the cross-section of the drawbar vertical member 38 of the positioning apparatus 22 is to allow it to telescopically and slidingly be received within the internal passageway 48 in the vertical support bar 40 of the positioning apparatus 22 so as to prevent rain from entering the internal passageway 48 in the vertical support bar 40 of the positioning apparatus 22, and with the vertical support bar 40 of the positioning apparatus 22 having a notch 59 at its lower end 61 that provides clearance for the gusset plate 50 of the positioning apparatus 22 when the drawbar vertical member 38 of the positioning apparatus 22 is completely received in the internal passageway 48 in the vertical support bar 40 of the positioning apparatus 22.

The support assembly 24 comprises of horizontal support bar 60 and load holders 62. An upper end 64 of the vertical support bar 40 of the positioning apparatus 22 is rigidly attached to the midpoint of the horizontal support bar 60 of the support assembly 24, with the longitudinal axis of the horizontal support bar 60 of the support assembly 24 being substantially perpendicular to both the longitudinal axis of the vertical support bar 40 of the positioning apparatus 22 and the longitudinal axis of the drawbar 26.

The vertical support bar 40 of the positioning apparatus 22 is attached to the horizontal support bar 60 of the support assembly 24 preferably by welding, but other means of rigid attachment, such as brackets and bolts are suitable without departing in any way from the spirit of the present invention.

The securing holes 58 in the vertical support bar 40 of the positioning apparatus 22 includes a plurality of pairs of coaxially aligned securing holes 68 through opposed front and rear walls 20 thereof for alignment with the pair of coaxially aligned stationary holes 52 in opposed front and rear walls 54 in the drawbar vertical member 38 of the positioning apparatus 22 and for receipt of the positioning pin 42 of the positioning apparatus 22, once the desired pair of securing holes of the plurality of pairs of coaxially aligned securing holes 68 through opposed front and rear walls 20 of vertical support bar 40 of the positioning apparatus 22 have been aligned with the pair of coaxially aligned stationary holes 52 in the opposed front and rear walls 54 in the drawbar vertical member 38 of the positioning apparatus 22.

It is to be understood, however, that any number of pairs of securing holes of the plurality of pairs of coaxially aligned securing holes 68 through the opposed front and rear walls 20 of the vertical support bar 40 of the positioning apparatus 22 could be used without departing in any way from the spirit of the present invention.

The distance between the plurality of pairs of coaxially aligned securing holes 68 through the opposed front and rear walls 20 of the vertical support bar 40 of the positioning apparatus 22 can be varied for different embodiments, depending on the desired degree of adjustability.

The horizontal support bar 60 of the support assembly 24 is a rigid member, and is preferably constructed of about four feet of one-and-one-half-inch by one-and-one-half-inch by eighth-inch square steel tubing (1 ½"×1½"×⅛"), although various lengths and construction materials could also be used without departing in any way from the spirit of the present invention.

As previously described, the horizontal support bar 60 of the support assembly 24 is welded at its midpoint to the vertical support bar 40 of the positioning apparatus 22, with a pair of rigid triangular shaped braces 70 being attached at the joint of the horizontal support bar 60 of the support assembly 24 and the vertical support bar 40 of the positioning apparatus 22, and with the plurality of pairs of coaxially aligned securing holes 68 through the opposed front and rear walls 20 of the vertical support bar 40 of the positioning apparatus 22 being in the opposed front and rear walls 20 of the vertical support bar 40 of the positioning apparatus 22 so as to prevent the positioning pin 42 of the positioning apparatus 22 from being interfered with by the pair of rigid triangular shaped braces 70.

The pair of rigid triangular shaped braces 70 are preferably constructed of any rigid reinforcing material such as plate steel. It is to be understood, however, that bolted angular brackets could be used instead.

The load holders 62 of the support assembly 24 extend vertically from each end 72 of the horizontal support bar 60 of the support assembly 24. The load holders 62 of the support assembly 24 are preferably constructed from steel tubing which has been welded or other-wise rigidly attached to the horizontal support bar 60 of the support assembly 24.

It is to be understood, however, that although two load holders are depicted, other embodiments could employ none, or could employ one or more load holders at various locations along the horizontal support bar 60 of the support assembly 24.

In the embodiment depicted in FIG. 2, the lengths of the drawbar 26, the drawbar vertical member 38 of the positioning apparatus 22, and the vertical support bar 40 of the positioning apparatus 22 are sized to accommodate supporting a load with the tailgate down. Other embodiments, such as that depicted in FIG. 1, would include those in which the drawbar 26 may be shortened and the drawbar vertical member 38 of the positioning apparatus 22 or the vertical support bar 40 of the positioning apparatus 22 lengthened so as to support loads at the height of the top of a closed tailgate or even higher.

The drawbar 26 further includes a wheel vertical member 74 that is rigidly attached to the tail end 46 of the drawbar 26, rearwardly adjacent to the drawbar vertical member 38 of the positioning apparatus 22, and has a pair of opposing apertures 76 through opposing side walls 78 thereof, at their tops 80.

A single caster wheel 82 is rotatively and pivotally mounted to a vertical wheel support bar 84 that has a pair of opposing apertures 86 through opposing side walls 88 thereof, at their tops 90, and which is telescopically received in the wheel vertical member 74 of the drawbar 26, and is maintained therein by a positioning pin 92 that is maintained therein by a positioning pin clip 94.

It will be understood that each of the elements described above, or two or more together, may also find a useful application in other types of constructions differing from the types described above.

While the invention has been illustrated and described as embodied in a device for extending the bed of a transport vehicle, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A bed extender for extending the usable bed length of a vehicle that has a vehicle bed with a length, and a receiver hitch with a receiver orifice, comprising:

a) hitch connecting means for removably connecting said bed extender with the receiver orifice of the receiver hitch of the vehicle so as to allow said bed extender to be completely removed from the vehicle when said bed extender is not in use; said hitch connecting means comprising a drawbar being substantially rigid and horizontal; said drawbar having an insertion end with a square cross-section appropriately sized for slidable insertion into the receiver orifice of the receiver hitch of the vehicle via an adapter; said drawbar having a handle thereon for assisting in the insertion process; said insertion end of said drawbar having two coaxially aligned holes formed through opposed vertical sidewalls thereof for operable attachment to said adapter for receipt therein of a drawbar retaining pin; said drawbar having a tail end being fixably attached with a gusset to a lower end of a drawbar vertical member of said drawbar; said drawbar vertical member of said drawbar being substantially perpendicular to said drawbar and substantially perpendicular to a line connecting said two coaxially aligned holes in said insertion end of said drawbar;

b) supporting means for supporting a load when the load is substantially beyond the length of the vehicle bed of the vehicle so as to allow the weight of that portion of the load beyond the vehicle bed of the vehicle to be translated to the receiver hitch of the vehicle via said supporting means and said hitch connecting means; said supporting means further comprising means for holding the load on said supporting means; said supporting means comprising a horizontal support bar being substantially parallel to a line connecting said two coaxially aligned holes in said insertion end of said drawbar; said horizontal support bar being rigidly attached at its midpoint to an upper end of a vertical support bar and having a pair of rigid triangular shaped braces attached at the joint of said horizontal support bar and said vertical support bar; said vertical support bar being substantially perpendicular to said horizontal support bar; and c) positioning means for attaching said hitch connecting means to said supporting means; said positioning means being substantially vertical; said positioning means having an upper end connected to said supporting means and a lower end connected to said hitch connecting means; said positioning means being of appropriate length so as to allow said supporting means to be at least substantially the same height as the vehicle bed of the vehicle; said positioning means being adjustable so as to allow the height of said supporting means to be adjusted relative to the receiver hitch of the vehicle so as to accommodate various vehicle models and tailgate configurations; said positioning means comprising said drawbar vertical member, said vertical support bar, and a support assembly pin; said drawbar vertical member and said vertical support bar appropriately sized so as to allow the lower end of said vertical support bar to slidably receive the upper end of said drawbar vertical member so as to prevent rain from entering into said vertical support bar; said lower end of said vertical support bar having a notch therein to clear said gusset when said drawbar vertical member is completely received in said vertical support bar; said drawbar vertical member further comprising a pair of coaxially aligned stationary holes in opposed front and rear walls thereof; said vertical support bar further comprising a plurality of pairs of coaxially aligned securing holes in opposed front and rear walls thereof so as to prevent said support assembly pin from being interfered with by said pair of rigid triangular shaped braces; said stationary holes and said securing holes sized to accommodate the insertion of said support assembly pin when a pair of said securing holes is aligned with said stationary holes after the insertion of said drawbar vertical member into said vertical support member.

2. The apparatus in claim 1, wherein said holding means comprises at least one load holder that is fixably attached to said horizontal support bar; said at least one load holder is substantially perpendicular to said horizontal support bar; each said load holder has a lower end that is fixably attached to said horizontal support bar and an upper end that extends vertically away form said horizontal support bar and is of sufficient length to prevent the shifting of a load off said horizontal support bar.

3. The apparatus in claim 1, wherein said vertical support bar and said drawbar vertical member are formed of rigid tubing and each has a polygonal cross-section.

4. The apparatus in claim 1, wherein said drawbar further includes a wheel vertical member that is rigidly attached to said tail end of said drawbar, rearwardly adjacent to said drawbar vertical member, and has a pair of opposing apertures through opposing side walls thereof, at their tops.

5. The apparatus in claim 4, wherein said drawbar further includes a single caster wheel that is rotatively and pivotally mounted to a vertical wheel support bar that has a pair of opposing apertures through opposing side walls thereof, at their tops, and which is telescopically received in said wheel vertical member of said drawbar, and is maintained therein by a positioning pin that is maintained therein by a positioning pin clip.

* * * * *